United States Patent [19]

Hilborn et al.

[11] Patent Number: 4,893,867
[45] Date of Patent: Jan. 16, 1990

[54] CONSOLE MOUNTED TO A HEADLINER

[75] Inventors: David M. Hilborn, Sterling Heights; Stephen P. McGarry, Rochester Hills, both of Mich.

[73] Assignee: United Technologies Automotive Inc., Dearborn, Mich.

[21] Appl. No.: 205,265

[22] Filed: Jun. 10, 1988

[51] Int. Cl.⁴ .................................. B60J 7/08
[52] U.S. Cl. ........................ 296/214; 206/39.1
[58] Field of Search ............ 296/37.7, 37.8, 214, 296/39.1, 39.2

[56] References Cited

U.S. PATENT DOCUMENTS

| | | | |
|---|---|---|---|
| 3,433,525 | 3/1969 | Augunas | 296/97.1 |
| 4,100,372 | 7/1978 | Hypolite | 296/37.7 X |
| 4,101,159 | 7/1978 | Stewart | 296/37.7 |
| 4,119,794 | 10/1978 | Matsuki | 296/214 X |
| 4,188,440 | 2/1980 | Doerer | 296/214 X |
| 4,211,590 | 7/1980 | Steward et al. | 296/214 X |
| 4,241,870 | 12/1980 | Marcus | 296/37.7 |
| 4,610,478 | 9/1986 | Tervol | 296/214 |
| 4,684,164 | 8/1987 | Durham | 296/37.7 |

FOREIGN PATENT DOCUMENTS

| | | | |
|---|---|---|---|
| 2731160 | 1/1979 | Fed. Rep. of Germany | 296/214 |
| 0018569 | 1/1982 | Japan | 296/39.1 |

Primary Examiner—Margaret A. Focarino
Assistant Examiner—Gary C. Hoge

[57] ABSTRACT

A combination headliner, retainer, console for use with a modular headliner for a motor vehicle. A substrate includes a depressed portion defining an opening therein. A retainer is mounted within the opening of the depressed portion and includes means for securing console mounted thereto. A console may be mounted to the retainer or directly to the substrate. Appropriate electrical connections may then be made between the retainer and console for providing electrical energy to the console. The retainer may further include extending wings for distributing the weight of the retainer and the console over a large area of the substrate.

31 Claims, 3 Drawing Sheets

CONSOLE MOUNTED TO A HEADLINER

DESCRIPTION

1. Cross Reference to Related Applications

This application relates to the following simultaneously filed patent applications: U.S. application Ser. No. 204,804, for HEADLINER AND SUNSHADE FASTENER by James D. Dowd, David M. Hilborn, Roy Weilant and Abdolhossein R. Lawassani; U.S. application Ser. No. 204,663, for MOTOR VEHICLE BODY STRUCTURE FOR RECEIVING SNAP-FIT MODULAR HEADLINER FASTENERS by James D. Dowd and David M. Hilborn; U.S. application Ser. No. 204,662, for ASSIST STRAP FOR A MODULAR HEADLINER by James D. Dowd, David H. Hilborn, Matthew J. Brown and Richard P. Bozyk; U.S. application Ser. No. 205,139, for MODULAR HEADLINER ASSEMBLY by James D. Dowd and Darrel Hampton; U.S. application Ser. No. 205,257, for SUNSHADE WITH SNAP-FIT FASTENER by James D. Dowd, David M. Hilborn, Roy Weilant and Abdolhossein R. Lawassani; U.S. application Ser. No. 204,670, for ASSIST STRAP FOR A MOTOR VEHICLE by James D. Dowd, David M. Hilborn, and Matthew J. Brown; U.S. application Ser. No. 205,150, for SUNSHADE FASTENER MODULE FOR USE WITH MODULAR HEADLINER by James D. Dowd, David M. Hilborn, Roy Weilant, and Abdolhossein R. Lawassani; U.S. application Ser. No. 205,130, for FRONT LAMP MODULE AND SUNSHADE SUPPORTS FOR MODULAR HEADLINER by James D. Dowd, David M. Hilborn, Roy Weilant, and Abdolhossein R. Lawassani; U.S. application Ser. No. 205,131, for MODULAR HEADLINER INCLUDING A WIRE HARNESS by James D. Dowd, Darrel Hampton, and Stephen P. McGarry.

2. Technical Field

The present invention is directed to a combination of a substrate forming a portion of a headliner, a retainer and a console. The retainer is generally arranged to be mounted to the substrate adjacent an opening formed therethrough and includes various features for distributing loads over the surface of the substrate. A console is mounted to the retainer such that the substrate is secured between the console and the retainer to provide the desired arrangement.

BACKGROUND OF THE INVENTION

It is known to assemble headliners to motor vehicles as a multi-step operation at various stations of a motor vehicle assembly line. Numerous operators and numerous stations are required to assemble the various components of the headliner as the vehicle moves along the assembly line.

The herein described invention concerns a modular headliner assembled off the assembly line and thereafter brought to the assembly line and which may be inserted into the vehicle and assembled thereto at a single station by a pair of operators. In order to provide such a modular headliner it is necessary to mount the appropriate consoles including lighting fixtures, hidden vanity mirrors, storage compartments, displays, sunglass holding compartments, garage door opening compartments, reading lamps, overhead lamps and the like to the substrate such that the consoles or modules are secured in position as part of the modular headliner prior to the assembly of the modular headliner to the vehicle.

As described herein the headliner substrate has a decorative surface observable to the occupant of the vehicle and non-show surface facing the vehicle roof. The substrate has a depressed portion extending downwardly from the adjacent substrate and defining an opening therein. A retainer is sized to extend through the substrate opening and to engage the substrate about the perimeter of the opening to sandwich the substrate therebetween to secure the retainer to the substrate. A console is thereafter mounted to the retainer and engaged therein such that the desired features of the console are available to the occupants of the vehicle after assembly of the modular headliner to the vehicle. The console is engaged to the retainer with a latching arrangement and includes a trim bezel extending outwardly beyond the substrate opening and retainer to hide the opening and the retainer from view of a vehicle occupant.

During shipping and handling of the modular headliners the consoles must be secured so as not to fall off or distort the design position or final configuration of the headliner prior to assembly to the vehicle. If the headliner configuration is distorted it will either not be capable of being assembled to the vehicle or it will provide an improper appearance when assembled.

As described herein the apparatus includes retention means such that the consoles are affixed to the headliner with the retainer ring which engages the non-show surface of the headliner and engages to the console when it is inserted through the show or decorative surface of the headliner. This combination produces a compression fit about the headliner and gives an attractive appearance at the console trim bezel to headliner interface, as well as performing the function of console retention to the headliner.

As described herein it will appear that the retainer may actually engage both sides of the substrate or may engage only one side of the substrate. Also the console may be engaged to the retainer or the retainer may be engaged to the console.

In addition to the retainer serving to engage the console to the substrate, the retainer also includes extensions which engage the non-show side of the headliner to provide a wide surface area in engagement with the substrate and over which the weight of the lamp or the console is distributed. By utilizing this wide surface area the possibility of the weight of the lamp causing permanent distortion to the headliner during severe shock impact, such as may be imposed upon the headliner during shipping or from assembly is reduced.

The retainer ring may also incorporate a snap-fit feature to engage the headliner for temporary adhesion to the headliner prior to sub-assembly of the console to the retainer ring. The retainer ring also may have a snap-fit feature engaging the console which provides for the one step assembly of the console to the headliner thus saving time during the assembly of the console. Additionally the retainer may further include a mesh type fastening means such as Dual-Lock ®. A mating portion of Dual Lock ® may be mounted to the vehicle body structure to which the headliner is assembled such that the two pieces of Dual Lock mesh providing support directly from the body structure of the vehicle to the retainer. Dual Lock is utilized because Dual Lock allows the two mesh fasteners to be slid, one relative to the other, without engaging or fastening the two pieces of Dual Lock to each other. The Dual Lock pieces are only fastened together when one is inserted into the other, and under that condition provides bonding to secure the two members to each other.

As disclosed herein a trim bezel will be indicated to extend beyond the substrate opening and beyond the retainer to hide both from the view of the occupant of the vehicle. This trim bezel may in fact be but a single piece extending across the entire bottom of the console.

Additionally disclosed is that a retainer may be mounted with an electrical connector as a portion thereof and the console may include a mating connector as a portion thereof such that mere assembly of the console to the retainer effects an electrical connection therebetween. Naturally the console connector will be electrically connected to the electrical components of the console and the retainer connector will be connected to the wire harness of the modular headliner which is connected to the body electrical system. Another method of achieving the same connection would be to have a connector forming an end portion of the modular headliner wire harness and the retainer including a fastening area for securing the connector at the end of the wire harness to a specific position wherein it may mate with the mating connector from the console when the console is assembled to the retainer.

As described herein the substrate is generally configured to include a depressed area to which the retainer and console are mounted. This depressed portion extends downwardly from the general plane of the substrate and is often located in the center of the headliner to form a console area. The depression of the substrate downwardly provides space between the plane of the substrate and the area which is depressed downwardly to secure retainer and console therein.

Prior art consoles have included add-on downwardly extending projections which were mounted to the existing headliner substrate to form a downwardly extending area to which consoles are mounted. These separate add-on pieces have not been formed as an integral part of the headliner and must be separately attached thereto.

SUMMARY OF THE INVENTION

It is an object of the present invention to provide a retainer capable of being secured to an opening formed in the substrate of a headliner.

Another object of the present invention is to provide a console which may be mounted to the retainer of the headliner.

It is a further object of the present invention to provide a retainer having appropriate surfaces for distributing the weight of the retainer and any console attached to the retainer over a large area of the substrate.

It is a still further object of the present invention to provide mating electrical connectors between a retainer and a console such that upon assembly the console to the retainer the appropriate electrical connections are made.

It is yet a further object of the present invention to provide latching means either in the retainer or the console or both to secure one to the other when one is assembled to the other.

Another object of the present invention is to provide a safe, economical, easy to assemble, and reliable substrate, retainer, console combination for use with a modular headliner.

Other objects will be apparent from the description to follow and the appended claims.

The above objects are achieved according to the preferred embodiment of the invention by the provision of a combination of a headliner and retainer for use with a motor vehicle. The combination includes a substrate generally configured to be mounted adjacent to the roof of the motor vehicle, said substrate having a decorative surface observable to an occupant of the vehicle and a non-show surface facing the vehicle roof, wherein said substrate includes a depressed portion extending downwardly from the adjacent substrate, said depressed portion defining a substrate opening therein, and a retainer designed to extend through the substrate opening, said retainer having perimeter walls defining a central cavity in which the vehicle accessory may be mounted and at least one shelf extending outwardly from the wall to engage the non-show surface of the substrate adjacent to the substrate opening to mount the retainer to the substrate.

Also disclosed is a combination headliner and console which includes a substrate generally configured to be mounted adjacent to the roof of a motor vehicle, said substrate having a decorative surface facing the interior of the vehicle when the substrate is assembled to the vehicle and a non-show surface facing the roof of the vehicle, said substrate defining a substrate opening therein and a console sized to fit within said opening, said console including fastening means for securing the console to the substrate with the console mounted within the opening, said console further including a trim bezel sized to cover said opening.

Further disclosed is a headliner assembly for use in a motor vehicle which includes a substrate configured to serve as a headliner for a motor vehicle, said substrate including a depressed portion extending downwardly from the adjacent substrate and said depressed portion defining a substrate opening, a retainer sized to fit within said substrate opening, said retainer including at least one shelf extending from said retainer to engage the substrate adjacent to the substrate opening to hold the retainer in position, and a console sized to fit through the substrate opening, said console including means to engage the retainer to secure the console to the retainer and the substrate and a trim bezel sized to cover the substrate opening positioned on the opposite side of the substrate from the retainer shelf.

Further disclosed is a retainer for mounting a console to a headliner defining an opening therethrough which includes a retainer body defining a central cavity to receive the console, at least two planar shelves extending outwardly from the retainer body, at least one latching finger extending from the retainer body and positioned to fit through the headliner opening such that the headliner adjacent the opening may be secured between the latching finger shelf and means for securing the console to the retainer body. Additionally disclosed are a pair of wings extending horizontally from the retainer to distribute the load caused by the weight of the retainer and console over the headliner.

BRIEF DESCRIPTION OF THE DRAWINGS

FIG. 1A is a sectional view of FIG. 1 taken at the indicated line.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figure 1:
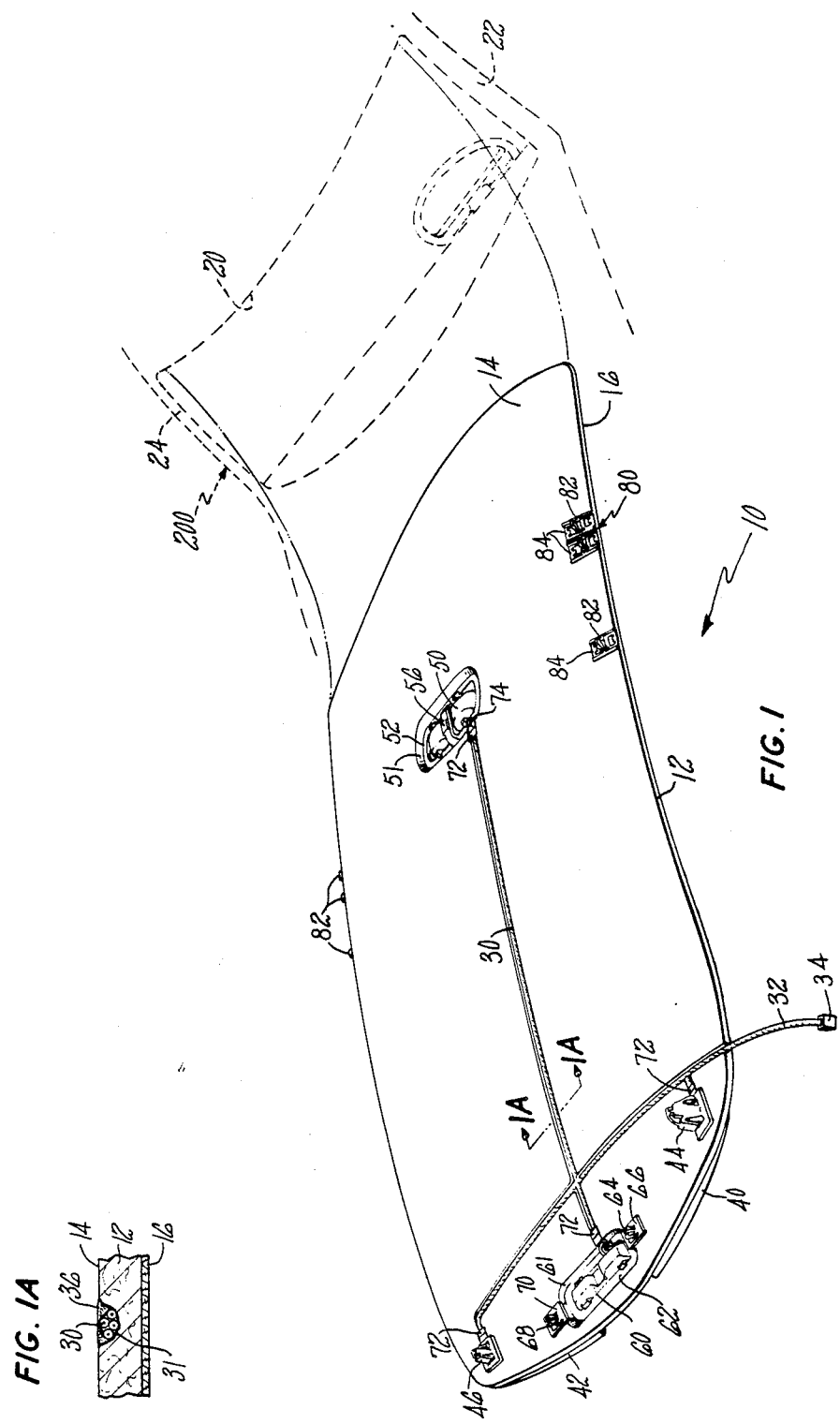
FIG. 1 is a perspective view of a modular headliner assembly positioned adjacent the vehicle windshield opening for assembly therethrough.

FIG. 1 is a perspective view of a modular headliner assembly 10 about to be installed into motor vehicle 200. The motor vehicle is shown having windshield opening 20, left A-pillar 22 and right A-pillar 24. The modular headliner is mounted into the partially assembled vehicle through the windshield or other large window opening which could also be the rear window opening. In this manner, the body structure of the vehicle may be assembled prior to the modular headliner assembly being mounted thereto.

Modular headliner assembly 10 consists of all those components between the decorative interior surface of the headliner and the body structure of the vehicle. The modular headliner 10 must be appropriately configured such that when assembled, the modular headliner may be shipped, handled and installed in the vehicle and potentially mistreated during a portion of this process without having the interior surface damaged, without distortion or bending due to uneven stresses and without impacting the function of the various components thereof.

As may be specifically seen in FIGS. 1 and 1A, the headliner includes substrate 12 made from a material such as molded fiberglass, styrene, cardboard, a polymeric material, or as is otherwise as known in the art. Substrate 12 has mounted on the surface thereof a decorative covering or surface 16 which is the surface visible to an occupant of the finished vehicle. The opposite side of substrate 12 from that on which decorative surface 16 is mounted is the non-show surface, surface 14.

Left sunshade 40 and right sunshade 42 are mounted to the substrate by the use of left sunshade fastener 44 and right sunshade fastener 46.

Additionally shown as part of the modular headliner are assist straps 80 which are retained to the modular headliner by retainers 84 interacting with assist strap legs 82.

Also shown as a portion of modular headliner 10 is center console 50 which is shown secured within depressed portion 51 formed in the substrate to retainer 52. A mesh fastener 56 is shown located to extend upwardly from retainer 52.

Likewise, forward console 60 is shown mounted within depressed portion 61 formed in the headliner in combination with forward retainer 62. Forward retainer 62 includes an outwardly projecting area through which left inboard sunshade support 64 and right inboard sunshade support 68 extend. Appropriate retainers 66 and 70 are shown for securing the legs of the inboard sunshade supports to hold the inboard sunshade supports in position.

Further shown as part of the modular headliner is wire harness 30 having a wire bundle 32, including a vehicle electrical connector 34 and a series of accessory connectors 72 located adjacent each accessory requiring electrical connections. Complementary connectors 74 extend from each accessory and mate with accessory connectors 72 to form a completed wire harness. Vehicle electrical connector 34 is typically connected to a mating connection extending from the vehicle body electrical system in an easy to access area such as one of the A-pillars.

Additionally it may be seen that the modular headliner wire harness is secured within substrate channels 31 such that the wire is maintained therein. Additionally, adhesive 36 may be placed over the wire bundle to secure the wire bundle within the channel. In this manner, the wires are protected from inadvertent contact with roof bows or other roof structure and the potential for damage to the wires is avoided.

As may be seen in FIG. 1, the modular headliner assembly is about to be inserted into the vehicle for assembly thereto. The left and right sunshade fasteners, 44 and 46, extend upwardly and include legs for engaging with the metal structure of the vehicle to mount the same thereto. Likewise, assist straps 80 have upwardly extending legs 82 which engage appropriate openings in the body structure to also secure the modular headliner to the vehicle. Furthermore, mesh fastener 56 may appropriately interact with a corresponding mesh fastener to likewise secure the headliner to the body structure. Hence, the left and right sunshade fasteners and at least one of the two assist strap handles are used for securing the modular headliner assembly to the motor vehicle. Furthermore, the mesh fastener of retainer 52 may likewise serve such a function. Also not to be ignored are the right inboard sunshade support and the left inboard sunshade support which also includes legs for engaging the sheet metal structure of the vehicle.

In order to assemble the modular headliner to the vehicle, the headliner is slid through a large window opening such as a windshield and placed in general position to which it is to be mounted. An operator then positions one of the sunshade fasteners to feel when the fastener mates with an appropriate opening. The sunshade fastener is then snap-fit into the opening to mount that portion of the modular headliner. The same process is then followed with the other sunshade fastener, the assist straps and the inboard sunshade supports. In this manner, the entire modular headliner may be snap-fit to the motor vehicle. Thereafter, an appropriate electrical connection is made at vehicle electrical connector 34 and the assembly process for the headliner is complete.

Figure 2:
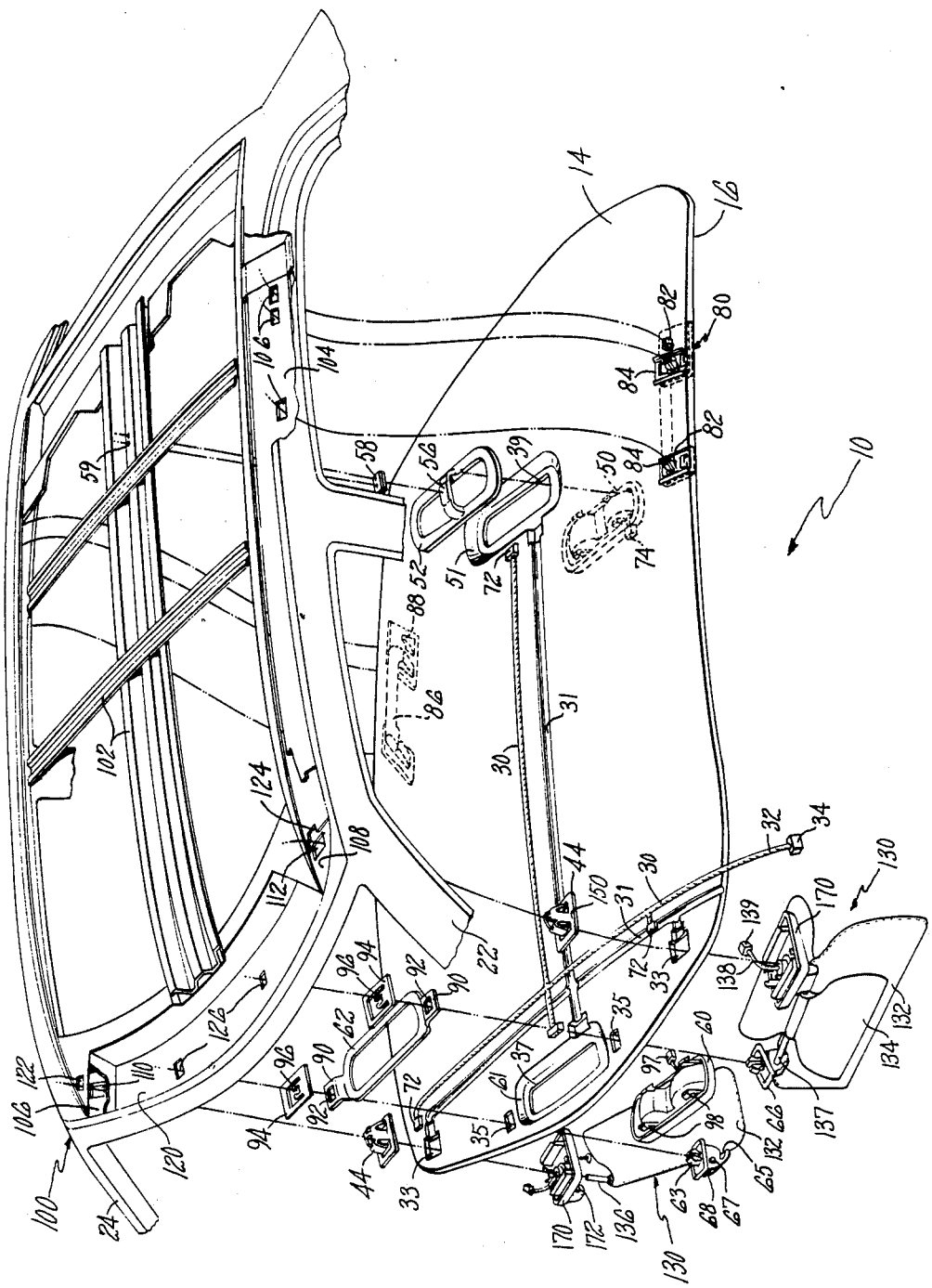
FIG. 2 is an exploded perspective view of a modular headliner assembly and appropriate portions of the vehicle body structure.

In FIG. 2 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 39, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure. This mesh retainer is preferably a Dual Lock ® retainer. By the selection of Dual Lock material, it is possible that the headliner may slide into position with one portion of the Dual Lock fastener sliding relative to the other. The Dual Lock fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 84 projecting through the headliner substrate. Retainers 82 are shown in engagement with legs 84 to secure the assist straps to the headliner. An assist strap may include handle 86 and a coat hook 88, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 2 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacle portions to due such.

Figure 3:
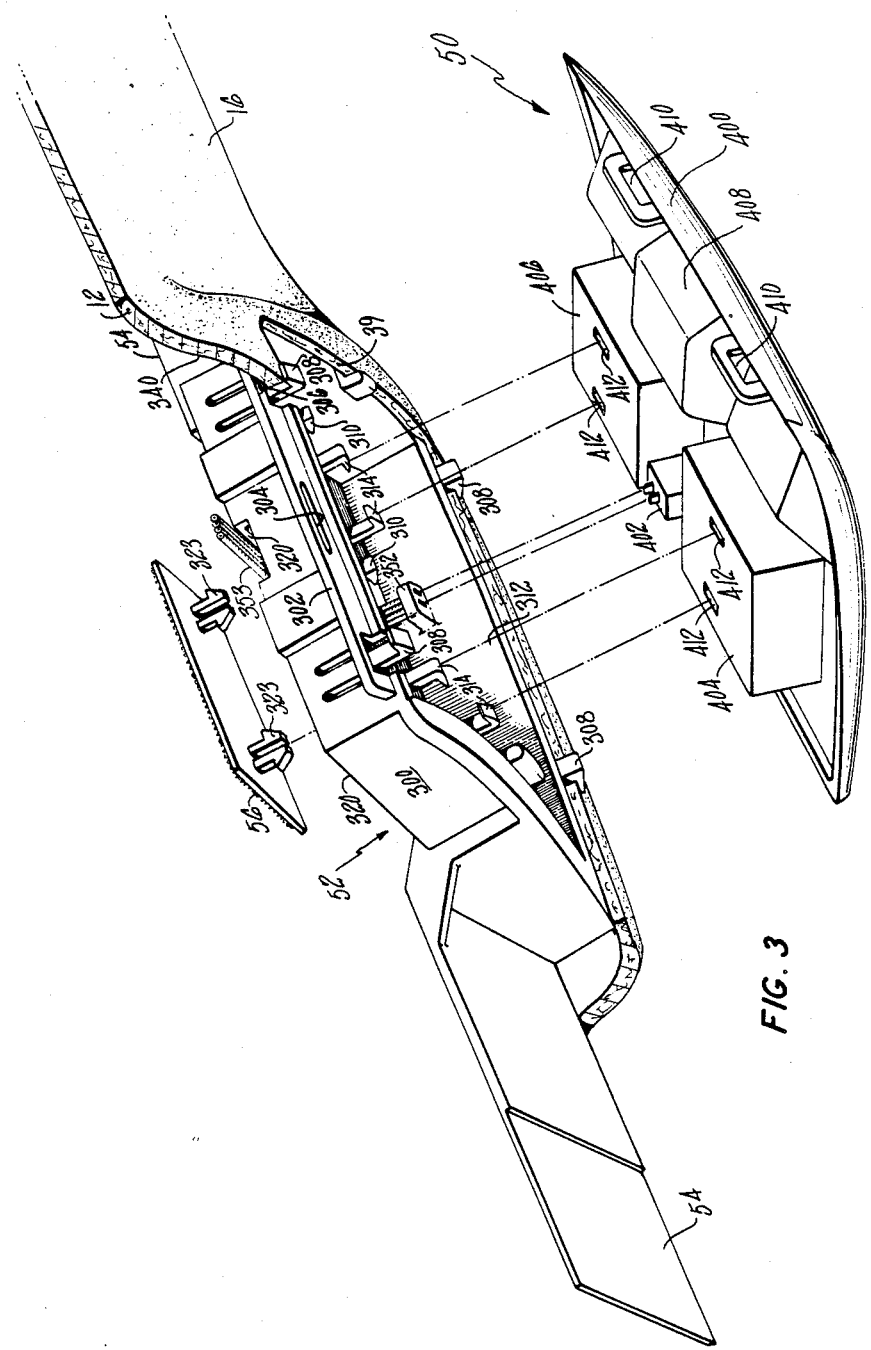
FIG. 3 is an exploded, perspective view of a console mounted to a retainer in a vehicle headliner.

FIG. 3 is an exploded, perspective view of retainer 52 and console 50 shown as a portion of the modular headliner. Retainer 52 is shown having walls 300 extending in a generally vertical direction, having flexible fingers 310 extending inwardly therefrom and shelf 302 extending outwardly therefrom. Additionally, latching finger 308, extend below and outwardly from wall 300. The retainer defines a central cavity 312 into which console 50 may be mounted, the console containing the selected accessories for the chosen headliner. Console 50 includes trim bezel 400, lamp housings 404 and 406 wherein lamps may be mounted, electrical connector 402, catch 410, slots 412 formed in the lamp housing and switch housing 408 wherein any number of switches or similar components may be mounted.

The retainer may additionally include a back panel 320 (not directly shown) to which a Dual Lock ® fastener 56 having a pair of snap fasteners 323 may be secured. These fasteners ma be snap-fit into an opening in back panel 320 (not shown) using snap fasteners 323 to which the Dual Lock is secured. Electrical connector 352 may also be a portion of the retainer such that assembly of the console to the retainer acts to electrically engage connector 402 mounted to the console to connector 352 mounted to the retainer. Wires 353 are shown extending from connector 352 to the headliner wire harness.

Shelf 302 is mounted to the retainer and may define shelf openings 304 therein through which or adjacent to which adhesive 306 is applied to additionally secure the retainer to the substrate. Latching fingers 308 are provided such that upon assembly of the retainer to the substrate through substrate opening 39, the shelf will sit on top of the substrate and the latching finger will engage the bottom of the substrate to sandwich the substrate therebetween to lock the retainer in position.

The substrate is originally formed or molded to create a depressed portion 340 to which the retainer and console are mounted. It is within this depressed portion that substrate opening 39 is formed. Shelf 302 sits on the substrate within the depressed portion. As may be seen in FIG. 1, the nondepressed portion of the substrate is substantially the same height as of the top of the retainer. In this manner, retainer wings 54 which may extend outwardly from the retainer, may act to engage the top of the nondepressed portions of the substrate. The retainer wings are of significant area such that the load or weight from the console and retainer may be distributed over wide areas of the substrate. This weight distribution acts to prevent the modular headliner from being distorted during the assembly and shipping process due to the weight of the console and retainer.

Flexible fingers 310 extends inwardly and may coact with catches 410 of console 50 or console 50 may additionally have mounting means such that as console 50 is snap-fit into the retainer, the two are secured together. Housing fingers 314 extend downwardly from retainer 52 within cavity 312 and are positioned to engaged slots 412 of lamp housings 404 and 406 to further secure the console to the retainer. Trim bezel 400 is shown as a part of console 50 and extends to cover latching fingers 308 and substrate openings 39 such that the trim bezel mates with the depressed portion of the substrate at the decorative surface to provide a quality looking console mounted to the headliner. The latching fingers should not be observable to the vehicle occupant after assembly.

The invention has been described with reference to a particular embodiment. It is to be understood by those skilled in the art that variations and modifications can be made within the spirit and scope of the invention.

The invention has been described with reference to a particular embodiment. It is to be understood by those skilled in the art that variations and modifications can be made within the spirit and scope of the invention.

We claim:

1. A combination headliner and retainer for use with a motor vehicle which comprises:
   a substrate generally configured to be mounted adjacent the roof of a motor vehicle, said substrate having a decorative surface observable to an occupant of the vehicle and a non-show surface facing the vehicle roof;
   wherein said substrate includes a depressed portion extending downwardly from the adjacent substrate, said depressed portion defining a substrate opening therein; and
   a retainer sized to extend through the substrate opening, said retainer having perimeter walls defining a central cavity in which a vehicle accessory may be mounted, and at least one shelf extending outwardly from a wall to engage the non-show surface of the substrate adjacent the substrate opening t mount the retainer to the substrate.

2. The apparatus as set forth in claim 1 wherein the retainer further comprises latching fingers mounted to the perimeter walls, said latching fingers extending to engage the decorative surface of the substrate to secure the substrate between the latching fingers and the shelf.

3. The apparatus as set forth in claim 1 wherein the shelf is provided with adhesive to secure the shelf to the non-show surface of the substrate.

4. The apparatus as set forth in claim 1 wherein the retainer further comprises at least one horizontally extending wing secured to a perimeter wall, said wing extending to engage a portion of the substrate other than the depressed portion.

5. The apparatus as set forth in claim 4 wherein the retainer comprises a pair of wings extending from opposed perimeter walls in opposite directions, each wing engaging a portion of the substrate other than the depressed portion.

6. The apparatus as set forth in claim 1 wherein the retainer further comprises fastening means positioned to be engaged by a vehicle accessory when mounted within the central cavity to assist in securing such vehicle accessory therewithin.

7. The apparatus as set forth in claim 2 wherein the retainer further comprises a back panel having a top surface and connected to each of the perimeter walls to collectively define an enclosure having an opening facing downwardly.

8. The apparatus as set forth in claim 7 and further comprising a slidable mesh fastener affixed to said top surface of the back panel and a mating mesh fastener secured to the vehicle roof, whereby upon assembly of the substrate and retainer to the motor vehicle the mesh fasteners engage.

9. The apparatus as set forth in claim 1 and further comprising a trim bezel sized to cover at least a portion of the central cavity of the retainer and means for mounting the trim bezel to the retainer.

10. The apparatus as set forth in claim 9 and including components to be mounted to the headliner wherein the components are secured with the retainer.

11. A combination headliner and console for a motor vehicle having a roof, which comprises:
    a substrate generally configured to be mounted adjacent the roof, said substrate having a decorative surface facing the interior of the vehicle when the substrate is assembled to the vehicle and a non-show surface facing the roof of the vehicle;
    said substrate defining a substrate opening therein; and
    a console sized to fit within said opening, said console including fastening means for securing the console to the substrate with the console mounted within the opening, said console further including a trim bezel sized to cover said opening;
    said trim bezel extending to mate with the decorative surface of the adjacent substrate to fully cover the opening and to eliminate large gaps between the bezel and the substrate;
    said substrate including a depressed portion displaced downwardly therefrom and wherein the opening is defined within the depressed portion.

12. The apparatus as set forth in claim 11 wherein the trim bezel extends to mate with the decorative surface of the substrate within the depressed portion.

13. The apparatus as set forth in claim 11 wherein the console further comprises electrical accessories and wherein the console includes an electrical connector and wherein the substrate includes a wire harness mounted thereto and wherein the console electrical connector is connected to said wire harness.

14. The apparatus as set forth in claim 11 wherein the console includes an illumination means.

15. The apparatus as set forth in claim 11 wherein the console includes a vanity mirror.

16. The apparatus as set forth in claim 11 wherein the console includes a garage door opener operator means.

17. The apparatus as set forth in claim 11 wherein the console includes a storage compartment.

18. The apparatus as set forth in claim 11 wherein the console includes a display.

19. The apparatus as set forth in claim 11 and further comprising a retainer mounted to the substrate about the opening and wherein the console fastening means mates with the retainer to secure the console to the substrate.

20. The apparatus as set forth in claim 19 wherein the retainer further comprises a retainer electrical connector capable of being connected to the vehicle electrical system and wherein the console further comprises electrical components and a console electrical connector electrically connected to the electrical components of the console, said retainer electrical connector and said console electrical connector being appropriately aligned whereby upon assembly of the console to the retainer, the console electrical connector mates with the retainer electrical connector to form an electrical connection therebetween.

21. A headliner assembly for use with a motor vehicle which comprises:
   a substrate configured to serve as the headliner of a motor vehicle, said substrate including a depressed portion extending downwardly therefrom and said depressed portion defining a substrate opening;
   a retainer sized to fit within said substrate opening, said retainer including at least one shelf extending from said retainer to engage a surface of the substrate adjacent the substrate opening to hold the retainer in position; and
   a console sized to fit through the substrate opening, said console including means to engage the retainer to secure the console to the retainer and the substrate and a trim bezel sized to cover the substrate opening and positioned on a surface of the substrate opposite that engaged by the retainer shelf.

22. The apparatus as set forth in claim 21 wherein the retainer includes a retainer electrical connector and wherein the console includes a console electrical connector, each positioned in alignment with the other whereby upon assembly of the console to the retainer the retainer electrical connector is electrically connected to the console electrical connector.

23. The apparatus as set forth in claim 21 wherein the console means to engage the retainer comprises at least one catch and wherein the retainer includes a flexible finger which may engage the catch to secure the console to the retainer.

24. The apparatus as set forth in claim 21 wherein the retainer comprises at least one flexible finger having an extending contact surface and wherein the console means to engage the retainer comprises a contact portion which may be engaged by the contact surface of the flexible finger to secure the console to the retainer.

25. The apparatus as set forth in claim 21 wherein the retainer comprises means to engage the substrate about the substrate opening on the opposite surface of the substrate from the engagement thereof with the shelf to secure the substrate therebetween.

26. The apparatus as set forth in claim 25 wherein the retainer and console have a characteristic weight associated therewith and the retainer further comprises a pair of oppositely extending wings positioned to engage the substrate at other than the depressed portion thereof, said wings acting to spread said weight over a large area of the substrate.

27. A retainer for mounting a console to a headliner and defining an opening therethrough, said retainer and console having a characteristic weight associated therewith, said retainer comprising
   a retainer body defining a central cavity for the receipt of a console;
   at least one planar shelf extending outwardly from the retainer body;
   at least one latching finger extending from the retainer body and positioned to fit through the headliner opening such that the headliner adjacent the opening may be secured between the latching finger and the shelf; and
   means for securing the console to the retainer body.

28. The apparatus as set forth in claim 27 wherein the means for securing comprises a flexible mounting finger including a contact surface positioned to engage a cooperating portion of the console.

29. The apparatus as set forth in claim 27 and further comprising a pair of wings extending horizontally from the retainer body, said wings being positioned to engage the headliner to distribute the weight of the retainer and console over the headliner.

30. The apparatus as set forth in claim 27 wherein the headliner includes a wire harness and the retainer includes a connector formed as a portion of the retainer body and electrically connected to the wire harness, said connector being positioned to be electrically mated with a counterpart connector on the console upon assembly of the console to the retainer.

31. The apparatus as set forth in claim 27 wherein the headliner includes a wire harness having conductors and a connector, and wherein the retainer further comprises a retainer connector holder into which the connector may be mounted such that upon assembly of the console to the retainer a mating console connector will electrically engage the connector secured in the retainer connector holder.

* * * * *

UNITED STATES PATENT AND TRADEMARK OFFICE
CERTIFICATE OF CORRECTION

PATENT NO. : 4,893,867

DATED : January 16, 1990

INVENTOR(S) : David M. Hilborn, Stephen P. McGarry

It is certified that error appears in the above-identified patent and that said Letters Patent is hereby corrected as shown below:

Column 9, claim 1, line 54, after "vehicle" insert --having a roof--.

Column 9, claim 1, lines 61 and 62, delete "from the adjacent substrate" and insert --therefrom--.

Signed and Sealed this

Fourteenth Day of May, 1991

Attest:

HARRY F. MANBECK, JR.

Attesting Officer

Commissioner of Patents and Trademarks